(12) United States Patent
Ren

(10) Patent No.: US 10,989,725 B2
(45) Date of Patent: Apr. 27, 2021

(54) METHOD OF OPERATING A LABORATORY SAMPLE DISTRIBUTION SYSTEM, LABORATORY SAMPLE DISTRIBUTION SYSTEM, AND LABORATORY AUTOMATION SYSTEM

(71) Applicant: Roche Diagnostics Operations, Inc., Indianapolis, IN (US)

(72) Inventor: Shubin Ren, Vienna (AT)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 209 days.

(21) Appl. No.: 15/988,637

(22) Filed: May 24, 2018

(65) Prior Publication Data

US 2018/0348244 A1 Dec. 6, 2018

(30) Foreign Application Priority Data

Jun. 2, 2017 (EP) ..................................... 17174346

(51) Int. Cl.
| | | |
|---|---|---|
| *G01N 35/04* | (2006.01) | |
| *G01N 35/00* | (2006.01) | |
| *B65G 54/02* | (2006.01) | |

(52) U.S. Cl.
CPC ............ *G01N 35/04* (2013.01); *B65G 54/02* (2013.01); *G01N 35/00584* (2013.01); *B65G 2201/0261* (2013.01); *G01N 2035/0406* (2013.01); *G01N 2035/0462* (2013.01); (Continued)

(58) Field of Classification Search
None
See application file for complete search history.

(56) References Cited

U.S. PATENT DOCUMENTS

| | | |
|---|---|---|
| 3,273,727 A | 9/1966 | Rogers et al. |
| 3,653,485 A | 4/1972 | Donlon |
| 3,901,656 A | 8/1975 | Durkos et al. |
| | (Continued) | |

FOREIGN PATENT DOCUMENTS

| | | |
|---|---|---|
| CN | 201045617 Y | 4/2008 |
| CN | 102109530 A | 6/2011 |
| | (Continued) | |

*Primary Examiner* — Kathryn Wright
(74) *Attorney, Agent, or Firm* — Roche Diagnostics Operations, Inc.

(57) ABSTRACT

A method of operating a laboratory sample distribution system is presented. The system comprises sample container carriers comprising a magnetically active device and configured to carry a sample container, interconnected transport plane modules configured to support carriers, and electromagnetic actuators arranged in rows and columns below each transport plane module and configured to move a carrier on top of the transport plane modules by applying a magnetic force to the carrier. The method comprises assigning transport plane modules to a route category. At least two traffic lanes are formed on the route categorized transport plane module. The carriers are moved within each traffic lane in a transport direction. The transport directions are opposite to each other. The method also comprises assigning another transport plane module to a waypoint category. A change from one transport direction to the opposite transport direction is possible on the waypoint categorized transport plane module.

11 Claims, 9 Drawing Sheets

(52) U.S. Cl.
CPC ............... *G01N 2035/0467* (2013.01); *G01N 2035/0472* (2013.01); *G01N 2035/0477* (2013.01)

(56) References Cited

U.S. PATENT DOCUMENTS

| | | | |
|---|---|---|---|
| 4,150,666 A | 4/1979 | Brush | |
| 4,395,164 A | 7/1983 | Beltrop et al. | |
| 4,544,068 A | 10/1985 | Cohen | |
| 4,771,237 A | 9/1988 | Daley | |
| 5,120,506 A | 6/1992 | Saito et al. | |
| 5,295,570 A | 3/1994 | Grecksch et al. | |
| 5,309,049 A | 5/1994 | Kawada et al. | |
| 5,457,368 A | 10/1995 | Jacobsen et al. | |
| 5,523,131 A | 6/1996 | Isaacs et al. | |
| 5,530,345 A | 6/1996 | Murari et al. | |
| 5,636,548 A | 6/1997 | Dunn et al. | |
| 5,641,054 A | 6/1997 | Mori et al. | |
| 5,651,941 A | 7/1997 | Stark et al. | |
| 5,720,377 A | 2/1998 | Lapeus et al. | |
| 5,735,387 A | 4/1998 | Polaniec et al. | |
| 5,788,929 A | 8/1998 | Nesti | |
| 6,045,319 A | 4/2000 | Uchida et al. | |
| 6,062,398 A | 5/2000 | Thalmayr | |
| 6,141,602 A | 10/2000 | Igarashi et al. | |
| 6,151,535 A | 11/2000 | Ehlers | |
| 6,184,596 B1 | 2/2001 | Ohzeki | |
| 6,191,507 B1 | 2/2001 | Peltier et al. | |
| 6,206,176 B1 | 3/2001 | Blonigan et al. | |
| 6,255,614 B1 | 7/2001 | Yamakawa et al. | |
| 6,260,360 B1 | 7/2001 | Wheeler | |
| 6,279,728 B1 | 8/2001 | Jung et al. | |
| 6,293,750 B1 | 9/2001 | Cohen et al. | |
| 6,429,016 B1 | 8/2002 | McNeil | |
| 6,444,171 B1 | 9/2002 | Sakazume et al. | |
| 6,571,934 B1 | 6/2003 | Thompson et al. | |
| 7,028,831 B2 | 4/2006 | Veiner | |
| 7,078,082 B2 | 7/2006 | Adams | |
| 7,122,158 B2 | 10/2006 | Itoh | |
| 7,278,532 B2 | 10/2007 | Martin | |
| 7,326,565 B2 | 2/2008 | Yokoi et al. | |
| 7,425,305 B2 | 9/2008 | Itoh | |
| 7,428,957 B2 | 9/2008 | Schaefer | |
| 7,578,383 B2 | 8/2009 | Itoh | |
| 7,597,187 B2 | 10/2009 | Bausenwein et al. | |
| 7,850,914 B2 | 12/2010 | Veiner et al. | |
| 7,858,033 B2 | 12/2010 | Itoh | |
| 7,875,254 B2 | 1/2011 | Garton et al. | |
| 7,939,484 B1 | 5/2011 | Loeffler et al. | |
| 8,240,460 B1 | 8/2012 | Bleau et al. | |
| 8,281,888 B2 | 10/2012 | Bergmann | |
| 8,502,422 B2 | 8/2013 | Lykkegaard | |
| 8,796,186 B2 | 8/2014 | Shirazi | |
| 8,833,544 B2 | 9/2014 | Stoeckle et al. | |
| 8,973,736 B2 | 3/2015 | Johns et al. | |
| 9,056,720 B2 | 6/2015 | Van De Loecht et al. | |
| 9,097,691 B2 | 8/2015 | Onizawa et al. | |
| 9,187,268 B2 | 11/2015 | Denninger et al. | |
| 9,211,543 B2 | 12/2015 | Ohga et al. | |
| 9,239,335 B2 | 1/2016 | Heise et al. | |
| 9,423,410 B2 | 8/2016 | Buehr | |
| 9,423,411 B2 | 8/2016 | Riether | |
| 9,567,167 B2 | 2/2017 | Sinz | |
| 9,575,086 B2 | 2/2017 | Heise et al. | |
| 9,593,970 B2 | 3/2017 | Sinz | |
| 9,598,243 B2 | 3/2017 | Denninger et al. | |
| 9,618,525 B2 | 4/2017 | Malinowski et al. | |
| 9,658,241 B2 | 5/2017 | Riether et al. | |
| 9,664,703 B2 | 5/2017 | Heise et al. | |
| 9,772,342 B2 | 9/2017 | Riether | |
| 9,791,468 B2 | 10/2017 | Riether et al. | |
| 9,810,706 B2 | 11/2017 | Riether et al. | |
| 9,902,572 B2 | 2/2018 | Mahmudimanesh et al. | |
| 9,939,455 B2 | 4/2018 | Schneider et al. | |
| 9,952,242 B2 | 4/2018 | Riether | |
| 9,969,570 B2 | 5/2018 | Heise et al. | |
| 9,989,547 B2 | 6/2018 | Pedain | |
| 10,197,586 B2 | 2/2019 | Sinz et al. | |
| 10,288,634 B2 | 5/2019 | Kaeppeli | |
| 2002/0009391 A1 | 1/2002 | Marquiss et al. | |
| 2003/0092185 A1 | 5/2003 | Qureshi et al. | |
| 2004/0050836 A1 | 3/2004 | Nesbitt et al. | |
| 2004/0084531 A1 | 5/2004 | Itoh | |
| 2005/0061622 A1 | 3/2005 | Martin | |
| 2005/0109580 A1 | 5/2005 | Thompson | |
| 2005/0194333 A1 | 9/2005 | Veiner et al. | |
| 2005/0196320 A1 | 9/2005 | Veiner et al. | |
| 2005/0226770 A1 | 10/2005 | Allen et al. | |
| 2005/0242963 A1 | 11/2005 | Oldham et al. | |
| 2005/0247790 A1 | 11/2005 | Itoh | |
| 2005/0260101 A1 | 11/2005 | Nauck et al. | |
| 2005/0271555 A1 | 12/2005 | Itoh | |
| 2006/0000296 A1 | 1/2006 | Salter | |
| 2006/0047303 A1 | 3/2006 | Ortiz et al. | |
| 2006/0219524 A1 | 10/2006 | Kelly et al. | |
| 2007/0116611 A1 | 5/2007 | DeMarco | |
| 2007/0210090 A1 | 9/2007 | Sixt et al. | |
| 2007/0248496 A1 | 10/2007 | Bondioli et al. | |
| 2007/0276558 A1 | 11/2007 | Kim | |
| 2008/0012511 A1 | 1/2008 | Ono | |
| 2008/0029368 A1 | 2/2008 | Komori | |
| 2008/0056328 A1 | 3/2008 | Rund et al. | |
| 2008/0131961 A1 | 6/2008 | Crees et al. | |
| 2009/0004732 A1 | 1/2009 | LaBarre et al. | |
| 2009/0022625 A1 | 1/2009 | Lee et al. | |
| 2009/0081771 A1 | 3/2009 | Breidford et al. | |
| 2009/0128139 A1 | 5/2009 | Drenth et al. | |
| 2009/0142844 A1 | 6/2009 | Le Comte | |
| 2009/0180931 A1 | 7/2009 | Silbert et al. | |
| 2009/0322486 A1 | 12/2009 | Gerstel | |
| 2010/0000250 A1 | 1/2010 | Sixt | |
| 2010/0152895 A1 | 6/2010 | Dai | |
| 2010/0175943 A1 | 7/2010 | Bergmann | |
| 2010/0186618 A1 | 7/2010 | King et al. | |
| 2010/0255529 A1 | 10/2010 | Cocola et al. | |
| 2010/0300831 A1 | 12/2010 | Pedrazzini | |
| 2010/0312379 A1 | 12/2010 | Pedrazzini | |
| 2011/0050213 A1 | 3/2011 | Furukawa | |
| 2011/0124038 A1 | 5/2011 | Bishop et al. | |
| 2011/0172128 A1 | 7/2011 | Davies et al. | |
| 2011/0186406 A1 | 8/2011 | Kraus et al. | |
| 2011/0287447 A1 | 11/2011 | Norderhaug et al. | |
| 2012/0037696 A1 | 2/2012 | Lavi | |
| 2012/0129673 A1 | 5/2012 | Fukugaki et al. | |
| 2012/0178170 A1 | 7/2012 | Van Praet | |
| 2012/0211645 A1 | 8/2012 | Tullo et al. | |
| 2012/0275885 A1 | 11/2012 | Furrer et al. | |
| 2012/0282683 A1 | 11/2012 | Mototsu | |
| 2012/0295358 A1 | 11/2012 | Ariff et al. | |
| 2012/0310401 A1 | 12/2012 | Shah | |
| 2013/0153677 A1 | 6/2013 | Leen et al. | |
| 2013/0180824 A1 | 7/2013 | Kleinikkink et al. | |
| 2013/0263622 A1 | 10/2013 | Mullen et al. | |
| 2013/0322992 A1 | 12/2013 | Pedrazzini | |
| 2014/0170023 A1 | 6/2014 | Saito et al. | |
| 2014/0202829 A1* | 7/2014 | Eberhardt | G01N 35/04 198/341.01 |
| 2014/0231217 A1* | 8/2014 | Denninger | B65G 43/00 198/358 |
| 2014/0234949 A1 | 8/2014 | Wasson et al. | |
| 2015/0014125 A1 | 1/2015 | Hecht | |
| 2015/0140668 A1 | 5/2015 | Mellars et al. | |
| 2015/0166265 A1 | 6/2015 | Pollack et al. | |
| 2015/0241457 A1 | 8/2015 | Miller | |
| 2015/0273468 A1 | 10/2015 | Croquette et al. | |
| 2015/0273691 A1 | 10/2015 | Pollack | |
| 2015/0276775 A1 | 10/2015 | Mellars et al. | |
| 2015/0276782 A1 | 10/2015 | Riether | |
| 2016/0003859 A1 | 1/2016 | Wenczel et al. | |
| 2016/0025756 A1 | 1/2016 | Pollack et al. | |
| 2016/0054341 A1 | 2/2016 | Edelmann | |
| 2016/0229565 A1 | 8/2016 | Margner | |
| 2016/0274137 A1 | 9/2016 | Baer | |
| 2016/0282378 A1 | 9/2016 | Malinowski et al. | |

(56) References Cited

U.S. PATENT DOCUMENTS

| | | |
|---|---|---|
| 2016/0341750 A1 | 11/2016 | Sinz et al. |
| 2016/0341751 A1 | 11/2016 | Huber et al. |
| 2017/0059599 A1 | 3/2017 | Riether |
| 2017/0097372 A1 | 4/2017 | Heise et al. |
| 2017/0101277 A1 | 4/2017 | Malinowski |
| 2017/0108522 A1 | 4/2017 | Baer |
| 2017/0131307 A1 | 5/2017 | Pedain |
| 2017/0131310 A1 | 5/2017 | Volz et al. |
| 2017/0138971 A1 | 5/2017 | Heise et al. |
| 2017/0168079 A1 | 6/2017 | Sinz |
| 2017/0174448 A1 | 6/2017 | Sinz |
| 2017/0184622 A1 | 6/2017 | Sinz et al. |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1* | 3/2018 | Mahmudimanesh .. G01N 35/04 |
| 2018/0074087 A1 | 3/2018 | Heise et al. |
| 2018/0106821 A1 | 4/2018 | Vollenweider et al. |
| 2018/0128848 A1 | 5/2018 | Schneider et al. |
| 2018/0156835 A1 | 6/2018 | Hassan |
| 2018/0188280 A1 | 7/2018 | Malinowski |
| 2018/0210000 A1 | 7/2018 | van Mierlo |
| 2018/0210001 A1 | 7/2018 | Reza |
| 2018/0217174 A1 | 8/2018 | Malinowski |
| 2018/0224476 A1 | 8/2018 | Birrer et al. |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0076845 A1 | 3/2019 | Huber et al. |
| 2019/0076846 A1 | 3/2019 | Durco et al. |
| 2019/0086433 A1 | 3/2019 | Hermann et al. |
| 2019/0094251 A1 | 3/2019 | Malinowski |
| 2019/0094252 A1 | 3/2019 | Waser et al. |
| 2019/0101468 A1 | 4/2019 | Haldar |
| 2019/0285660 A1 | 9/2019 | Kopp et al. |
| 2020/0200783 A1 | 6/2020 | Durco |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-190400 A | 9/2013 |
| SU | 685591 A1 | 9/1979 |
| WO | 1996036437 A1 | 11/1996 |
| WO | 2003042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2012/158520 A1 | 11/2012 |
| WO | 2012/158541 A1 | 11/2012 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

* cited by examiner

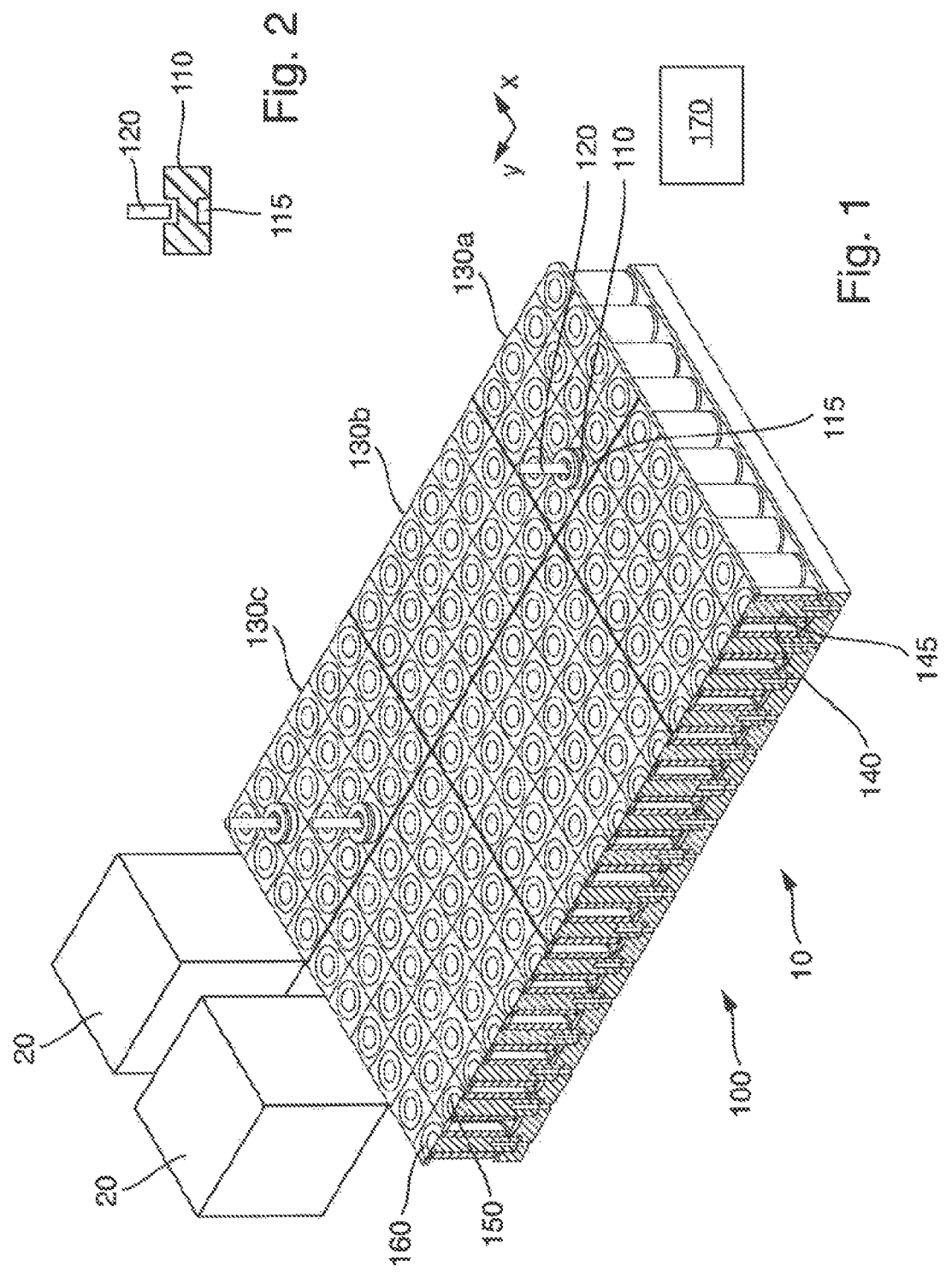

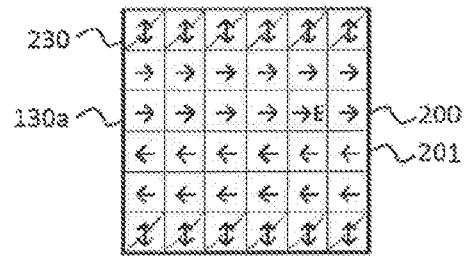
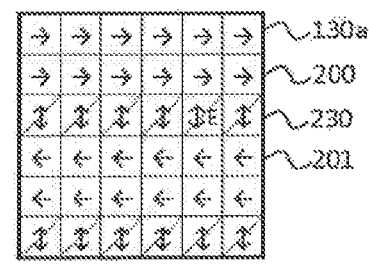
Fig. 12a          Fig. 12b
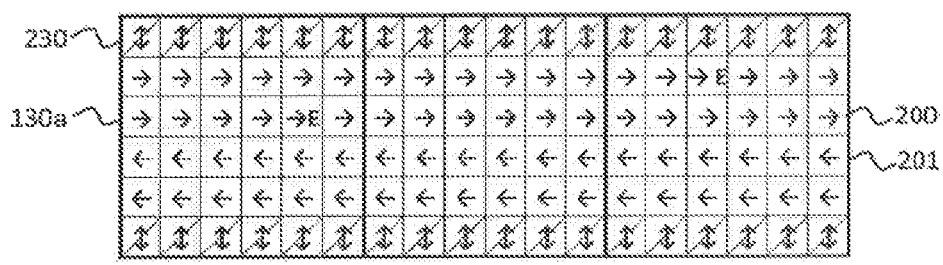
Fig. 13a
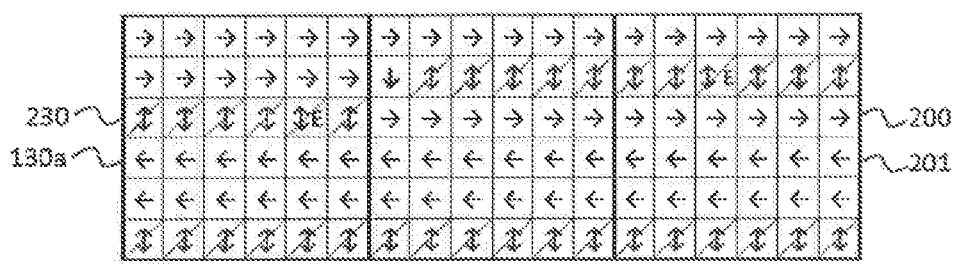
Fig. 13b

METHOD OF OPERATING A LABORATORY SAMPLE DISTRIBUTION SYSTEM, LABORATORY SAMPLE DISTRIBUTION SYSTEM, AND LABORATORY AUTOMATION SYSTEM

CROSS-REFERENCE TO RELATED APPLICATIONS

This application claims the benefit of EP 17174346.1, filed Jun. 2, 2017, which is hereby incorporated by reference.

BACKGROUND

The present disclosure relates to a method of operating a laboratory sample distribution system, a laboratory sample distribution system, and a laboratory automation system.

Laboratory sample distribution systems are used in laboratory automation systems comprising a number of laboratory stations. The laboratory sample distribution system can be used in order to distribute sample containers between the laboratory stations and other equipment.

In a typical laboratory sample distribution system, sample container carriers are moved on a transport plane. A number of electro-magnetic actuators is arranged below the transport plane in order to move the sample container carriers.

However, there is a need for a method of operating a laboratory sample distribution system, a laboratory sample distribution system and a laboratory automation system having a high distribution performance at reduced transport space required

SUMMARY

According to the present disclosure, a method of operating a laboratory sample distribution system is presented. The laboratory sample distribution system can comprise a number of sample container carriers. Each of the sample container carriers can comprise at least one magnetically active device. Each of the sample container carriers can be configured to carry at least one sample container. The laboratory sample distribution system can also comprise a number of interconnected transport plane modules. Each of the transport plane modules can be configured to support a number of the sample container carriers. The laboratory sample distribution system can also comprise a number of electro-magnetic actuators. Below each transport plane module, a number of the electro-magnetic actuators can be stationary arranged in rows and columns. The electro-magnetic actuators can be configured to move a sample container carrier of the sample container carriers on top of the transport plane modules along a row of the rows or along a column of the columns by applying a magnetic move force to the sample container carrier. The method can comprise assigning at least one transport plane module of the transport plane modules to a route category. At least two traffic lanes can be formed on the route categorized transport plane module. The sample container carriers can be moved within each traffic lane in a given transport direction. The transport directions of the at least two traffic lanes can be opposite to each other. A change from one transport direction to the opposite transport direction cannot be possible for the sample container carriers moved on the route categorized transport plane module. The method can also comprise assigning at least one another transport plane module of the transport plane modules to a waypoint category. A change from one transport direction to the opposite transport direction can be enabled for the sample container carriers moved on the waypoint categorized transport plane module.

Accordingly, it is a feature of the embodiments of the present disclosure to provide for a method of operating a laboratory sample distribution system, a laboratory sample distribution system and a laboratory automation system having a high distribution performance at reduced transport space required. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 1 illustrates schematically a perspective view of a laboratory automation system comprising a laboratory sample distribution system according to an embodiment of the present disclosure.

FIG. 2 illustrates a longitudinal section view of a sample container carrier of FIG. 1 according to an embodiment of the present disclosure.

FIG. 12a illustrates schematically another route categorized transport plane module with an erroneous electro-magnetic actuator below according to an embodiment of the present disclosure.

FIG. 12b illustrates schematically the route categorized transport plane module of FIG. 12a with reformed traffic lanes and a reformed buffer lane according to an embodiment of the present disclosure.

FIG. 13a illustrates schematically other route categorized transport plane modules with erroneous electro-magnetic actuators below according to an embodiment of the present disclosure.

FIG. 13b illustrates schematically the route categorized transport plane modules of FIG. 13a with reformed traffic lanes and reformed buffer lanes according to an embodiment of the present disclosure.

DETAILED DESCRIPTION

Figure 3:
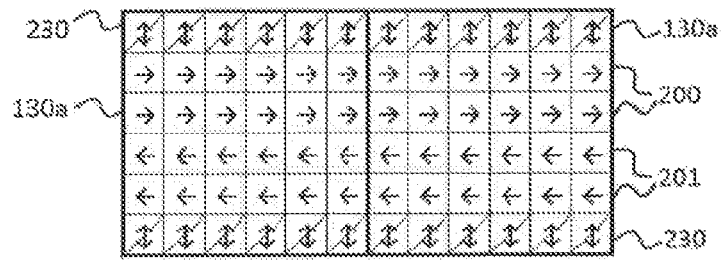
FIG. 3 illustrates schematically transport plane modules of FIG. 1 assigned to a route category according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A method of operating a laboratory sample distribution system is presented. The laboratory sample distribution system can comprise a number (e.g., 2 to 2000) of sample container carriers. Each of the sample container carriers can comprise at least one magnetically active device. Moreover, each of the sample container carriers can be configured to carry at least one sample container, in other words, one or more sample containers. Furthermore, the laboratory sample distribution system can comprise a number (e.g., 2 to 2000) of interconnected transport plane modules or parts. Each of the transport plane modules can be configured to support or carry a number or some of the sample container carriers. In other words, the sample container carriers may simply be placed on the interconnected transport plane modules. Moreover, the laboratory sample distribution system can comprise a number (e.g., 20 to 2000) of electro-magnetic actuators. Below each transport plane module, a number or some of the electro-magnetic actuators can be stationary arranged in rows and columns. The electro-magnetic actuators can be configured to move a sample container carrier of the sample container carriers, in particular all, on top of the transport plane modules, in particular exclusively, along a row of the rows or along a column of the columns by applying a magnetic move force to the sample container carrier.

The method can comprise assigning at least one transport plane module of the transport plane modules to a route category. At least two traffic, or transport, lanes can be formed on the route categorized transport plane module. The sample container carriers can be moved within each traffic lane in a given transport direction, in particular, only in one transport direction. The transport directions of the at least two traffic lanes can be opposite to each other. A change from one transport direction to the opposite transport direction and vice versa—from the opposite transport direction to the one transport direction—, cannot be possible, disabled, prevented, prohibited or not allowed for the sample container carriers moved on the route categorized transport plane module. The method can also comprise assigning at least one another transport plane module of the transport plane modules to a waypoint category. A change from one transport direction to the opposite transport direction and vice versa can be enabled, possible or allowed for the sample container carriers moved on the waypoint categorized transport plane module.

The sample containers may be designed as tubes made of glass or transparent plastic and may have an opening at an upper end. Furthermore, the sample containers may be used to contain, store and transport samples such as blood samples, urine samples or chemical or medical samples, e.g., to be analyzed by a number of laboratory stations.

The term "transport plane module" may denote that the number of transport plane modules may be embodied as separated constructional units and/or as subunits of, in particular only one, transport plane unit. In particular, the transport plane modules may be different from each other. The transport plane modules may be identically constructed. The term "interconnected" may denote that the transport plane modules may be interconnected, such that the sample container carriers may move from each of the transport plane modules directly or indirectly to each of the other modules. The interconnected transport plane modules may form a continuous transport plane, which may also be denoted as transport surface.

The electro-magnetic actuators may be solenoids surrounding ferromagnetic cores. Moreover, the electro-magnetic actuators may be driven or energized individually in order to generate or to provide a magnetic field. The magnetic field may interact with the magnetically active device of a respective sample container carrier. By the interaction, the electro-magnetic actuators may apply the magnetic move force to the sample container carrier. Hence, the sample container carrier may be translationally moved on the transport plane modules. For that purpose, the magnetically active device of the sample container carrier may be a permanent magnet. Alternatively, or additionally, an electromagnet and/or any magnetically soft material may be used. The sample container carriers may be configured to move in two dimensions on the transport plane modules. For that purpose, the rows and columns may be arranged in two dimensions such as, for example, quadratically. The electro-magnetic actuators may be arranged in a plane substantially parallel to the transport plane modules.

The assignment of at least one another transport plane module of the transport plane modules to a waypoint category may be performed after, at the same time as and/or before the assignment of at least one transport plane module of the transport plane modules to a route category. A respective traffic lane may be defined by at least one row of the rows and/or at least one column of the columns. A width of the sample container carrier on the transport plane module may correspond to or be smaller than a width of the traffic lane. In particular, no direction change may be possible on the route categorized transport plane module. Even though the route categorized transport plane module may be physically constructed, such that a direction change may be physically possible, in particular it may be free of barriers for the sample container carriers, a direction change on the route categorized transport plane module may not be logically possible.

The method can enable the control of the movements of the sample container carriers in a relative simple way such as, for example, on the at least one route categorized transport plane module. Furthermore, the method may reduce or prevent deadlock situations, in which sample container carriers may block each other. Moreover, the method may reduce or prevent a risk of collisions between sample container carriers. Hence, the method may enable a high distribution performance at reduced transport space required.

According to an embodiment, a change area can be formed on the waypoint categorized transport plane module. The change area can be configured to receive a sample container carrier of the sample container carriers from one traffic lane with a given transport direction and to pass, to forward, to transfer or to transmit the received sample container carrier to another traffic lane with an opposite transport direction and vice versa. In particular, within the change area, the sample container carrier may wait, until the another traffic lane is free. This may allow less or no sample container carriers on the one traffic lane, waiting for a direction change. In one embodiment, the change area may be different from the traffic lanes.

According to an embodiment, at least two traffic lanes can be formed on the waypoint categorized transport plane module. The sample container carriers can be moved within each traffic lane in a given transport direction. The transport directions of the at least two traffic lanes can be opposite to each other. The change area can be arranged in between the two traffic lanes at their sides such as, for example, directly next to one or both of them. The change area can be configured to receive a sample container carrier of the sample container carriers from the one traffic lane formed on the waypoint categorized transport plane module and to pass the received sample container carrier to the another traffic lane formed on the waypoint categorized transport plane module and vice versa. This can enable a direction change at reduced transport space required on a single transport plane module. The at least two traffic lanes formed on the waypoint categorized transport plane module may be in extension of the at least two traffic lanes formed on the route categorized transport plane module.

According to an embodiment, the change area can be completely surrounded by, for example, the at least, two traffic lanes formed on the waypoint categorized transport plane module. This may allow to receive and/or to pass the sample container carrier from and/or to all sides of the change area.

According to an embodiment, the sample container carriers can be moved within the change area such as, for example, only in a single direction. Hence, there may be no opposing traffic within the change area. Thereby, this may enable to reduce or to prevent deadlock situations and/or a risk of collisions within the change area.

According to an embodiment, a change within the change area can be possible only from the one traffic lane with a given transport direction to the another traffic lane with an opposite transport direction and not from the another traffic lane to the one traffic lane. This can enable control of the movements of the sample container carriers within the change area in a relative simple way. Hence, this may enable a high throughout through the change area.

According to an embodiment, the sample container carriers can be moved within the change area in a circle. This may enable a continuous traffic flow such as, for example, around a center of the change area.

According to an embodiment, an enter area can be formed on the waypoint categorized transport plane module. The enter area can be arranged in between the change area and a traffic lane of the traffic lanes directing to the change area such as, for example, in extension of the traffic lane. The enter area can be configured to receive a sample container carrier of the sample container carriers from the traffic lane and to pass the received sample container carrier to the change area, when there is no cross traffic within the change area blocking the sample container carrier. This can reduce or prevent deadlock situations and/or a risk of collisions within the change area and/or the enter area.

According to an embodiment, in particular directly, next to a traffic lane of the traffic lanes at least one buffer lane can be formed on the route categorized transport plane module and/or the waypoint categorized transport plane module. Each of the buffer lanes can be configured to receive a number of the sample container carriers from the corresponding traffic lane, to buffer the received sample container carriers, and to return the buffered sample container carriers to the corresponding traffic lane. This can buffer sample container carriers, e.g., if the sample container carriers are waiting for further movement over the transport plane module/s and/or if a sample container and/or a sample comprised in the sample container carrier waits for further processing. Further, the buffer lane may buffer empty sample container carriers. The buffer lane may be configured to buffer or to store a variable number (e.g., 2 to 500) of sample container carriers. In one embodiment, next to each traffic lane a buffer lane may be formed.

According to an embodiment, the traffic lanes and/or the buffer lanes and/or the change area and/or the enter area formed on the route categorized transport plane module and/or on the waypoint categorized transport plane module can be symmetrically arranged. This may control the movements of the sample container carriers in a relative simple way. Additionally, or alternatively this may require relatively low transport space. In particular, the lanes and/or the areas may be mirror-symmetrically and/or rotationally-symmetrically arranged.

According to an embodiment, the method can comprise checking the number of electro-magnetic actuators for errors and forming and/or reforming the traffic lanes and/or the buffer lanes and/or the change area and/or the enter area, and in one embodiment only, above error-free electro-magnetic actuators. This can enable a use of the laboratory sample distribution in spite of erroneous or defective electro-magnetic actuators.

According to an embodiment, the method can comprise assigning at least three transport plane modules of the transport plane modules to a laboratory station category. Handling a sample container carrier of the sample container carriers, handling a sample container and/or handling a sample by a laboratory station can be enabled on each of the laboratory station categorized transport plane modules. The method can also comprise assigning at least four transport plane modules to the waypoint category. To each of the laboratory station categorized transport plane modules, one of the waypoint categorized transport plane modules can be assigned or arranged such as, for example, directly next to it. The method can also comprise assigning at least three transport plane modules to the route category. In between each two of the waypoint categorized transport plane modules, at least one of the route categorized transport plane modules can be arranged, for example, directly next to one or both of them. The method can also comprise determining a route for a movement of the sample container carrier from one laboratory station categorized transport plane module to another laboratory station categorized transport plane module by listing the waypoint categorized transport plane modules and their order in between them. The method can also comprise moving the sample container carrier from one waypoint categorized transport plane module to the next one according to the determined list. This can determine the route in a relative simple way. Furthermore, this may enable a rerouting or redirecting of the sample container carrier in a relative simple way such as, for example, to another target laboratory station, e.g., if a primary target laboratory station is offline, in particular it may have an error or be maintained, if an electro-magnetic actuator is erroneous and/or if a traffic jam occurs on the route to the primary target laboratory station.

A laboratory sample distribution system can comprise the number of sample container carriers, the number of interconnected transport plane modules, and the number of electro-magnetic actuators. In addition, the laboratory sample distribution system can comprise a control device. The control device is adapted or configured to perform the method as described above.

In other words, the control device may be configured to assign at least one transport plane module of the transport plane modules to a route category, wherein at least two traffic lanes can be formed on the route categorized transport plane module, wherein the sample container carriers can be moved within each traffic lane in a given transport direction, wherein the transport directions of the at least two traffic lanes can be opposite to each other and wherein a change from one transport direction to the opposite transport direction may not be possible for the sample container carriers moved on the route categorized transport plane module. Furthermore, the control device may be configured to assign at least one another transport plane module of the transport plane modules to a waypoint category, wherein a change from one transport direction to the opposite transport direction can be enabled for the sample container carriers moved on the waypoint categorized transport plane module. The advantages of the method, as discussed above, can be made applicable for the laboratory sample distribution system.

For example, the control device may be configured to control the movements of the sample container carriers on top of the transport plane modules by driving or energizing the electro-magnetic actuators, such that the sample container carriers can move simultaneously and independent from one another along desired transport paths such as, for example, individual transport paths. The control device may comprise a personal computer (PC), a server, a processor, and/or a memory. In one embodiment, the control device may comprise sub-control devices, wherein to each transport plane module one of the sub-control devices may be assigned or arranged, wherein each of the sub-control devices may be configured to control the movements of the sample container carriers on top of the respective transport plane module.

According to an embodiment, below a transport plane module of the transport plane modules, and in one embodiment exactly, n times n electro-magnetic actuators of the electro-magnetic actuators can be stationary arranged in n rows and in n columns. n can be an integer and greater than three. In one embodiment, n may be greater than five and in another embodiment, exactly six. Additionally, or alternatively, below a transport plane module electro-magnetic actuators may be, in one embodiment, equidistantly spaced, stationary arranged in n rows and in n columns such as, for example, quadratically, wherein in each second row in each second position there may be no electro-magnetic actuator or in each center of a quadrat formed by corresponding electro-magnetic actuators no electro-magnetic actuator may be arranged and wherein n can be an integer and greater than three. With respect to this arrangement, it is referred to EP 3 070 479 A1, which content is incorporated into this document by reference. Furthermore, with respect to this arrangement, it is referred to EP 2 995 958 A1, which content is incorporated into this document by reference.

A laboratory automation system can comprise a number of laboratory stations such as, for example, a number of pre-analytical, analytical and/or post-analytical laboratory stations. In addition, the laboratory automation system can comprise a laboratory sample distribution system as described above. The laboratory sample distribution system can be configured to distribute the number sample container carriers and/or sample containers between the laboratory stations. In one embodiment, the laboratory stations may be arranged adjacent or directly next to the laboratory sample distribution system.

Pre-analytical laboratory stations may be configured to perform any kind of pre-processing of samples, sample containers and/or sample container carriers. Analytical laboratory stations may be configured to use a sample or part of the sample and a reagent to generate a measuring signal, the measuring signal indicating if and in which concentration, if any, an analyte exists. Post-analytical laboratory stations may be configured to perform any kind of post-processing of samples, sample containers and/or sample container carriers. The pre-analytical, analytical and/or post-analytical laboratory stations may comprise at least one of a decapping station, a recapping station, an aliquot station, a centrifugation station, an archiving station, a pipetting station, a sorting station, a sample container type identification station, a sample quality determining station, an add-on buffer station, a liquid level detection station, a sealing/desealing station, a pushing station, a belt station, a conveying system station and/or a gripper station for moving the sample container to or from the sample container carrier. The advantages of the laboratory sample distribution system, as discussed above, can be made applicable for the laboratory automation system.

Referring initially to FIG. 1, FIG. 1 schematically shows a laboratory automation system 10. The laboratory automation system 10 can comprise a number of laboratory stations 20, for example, pre-analytical, analytical and/or post-analytical laboratory stations. In the shown embodiment, only two laboratory stations 20 are depicted. Self-evidently, the laboratory automation system 10 may comprise more than two laboratory stations 20.

Furthermore, the laboratory automation system 10 can comprise a laboratory sample distribution system 100 configured to distribute a number of sample container carriers 110 and/or sample containers 120 between the laboratory stations 20. In the shown embodiment, the laboratory stations 20 can be arranged directly next to the laboratory sample distribution system 100.

In detail, the laboratory sample distribution system 100 can comprise the number of sample container carriers 110. As an example, three sample container carriers 110 are depicted. Self-evidently, the laboratory sample distribution system 100 may comprise a large number of sample container carriers 110, e.g., one hundred to several thousands of sample container carriers. Each of the sample container carriers 110 can comprise a magnetically active device 115, as depicted in FIG. 2, which is, in this embodiment, a single permanent magnet. Moreover, each of the sample container carriers 110 can be configured to carry one of the sample containers 120.

Further, the laboratory sample distribution system 100 can comprise a number of interconnected transport plane modules 130a, 130b, 130c. Each of the transport plane modules 130a, 130b, 130c can be configured to support a number of said sample container carriers 110.

The laboratory sample distribution system 100 can comprise a number of electro-magnetic actuators 140. In the shown embodiment, the electro-magnetic actuators 140 can be implemented as solenoids, each having a solid ferromagnetic core 145. Below each transport plane module 130a, 130b, 130c, a number of the electro-magnetic actuators 140 can be stationary arranged in rows 150 and columns 160 such as, for example, quadratically in a plane substantially parallel to the transport plane modules. The electro-magnetic actuators 140 can be configured to move a sample container carrier 110 of the sample container carriers on top of the transport plane modules 130a, 130b, 130c along a row 150 of the rows or along a column 160 of the columns by applying a magnetic move force to the sample container carrier 110. The electro-magnetic actuators 140 and the rows 150 and columns 160, respectively, can form logical fields on the transport plane modules 130a, 130b, 130c, as depicted in FIGS. 1 and 3-14b.

In addition, the laboratory sample distribution system 100 can comprise a control device 170. The control device 170 can be configured to perform a method as described below. Furthermore, the control device 170 can be configured to control the movements of the sample container carriers 110 on top of the transport plane modules 130a, 130b, 130c by driving the electro-magnetic actuators 140 such as, for example, individually, such that the sample container carriers 110 can move simultaneously and independent from one another along desired individual transport paths.

In the shown embodiment, each of the sample container carriers 110 can comprise a sliding surface at its underside. The sliding surfaces can be configured to be in contact with the transport plane modules 130a, 130b, 130c and can enable performing movements of the sample container carriers on the transport plane modules.

Furthermore, in the shown embodiment, the transport plane modules 130a, 130b, 130c can be embodied as separated constructional units identically constructed. The transport plane modules 130a, 130b, 130c can be interconnected, such that the sample container carriers 110 may move from each of the transport plane modules directly or indirectly to each of the other modules. The interconnected transport plane modules can form a continuous transport plane.

In detail below each transport plane module 130a, 130b, 130c of the transport plane modules, n times n electro-magnetic actuators 140 of the electro-magnetic actuators can be equidistantly spaced and arranged in n rows 150 and in n columns 160, wherein n can be six, e.g. as depicted in FIGS. 1 and 3. In alternative embodiments, n may be four, five or greater than six.

The laboratory sample distribution system 100 can be operated by a method as follows.

In step a) at least one transport plane module 130a of the transport plane modules can be assigned to a route category such as, for example, by the control device 170. At least two traffic lanes 200, 201 can be formed on the route categorized transport plane module 130a. The sample container carriers 110 can be moved within each traffic lane 200, 201 in a given transport direction. The transport directions of the at least two traffic lanes can be opposite to each other. A change from one transport direction and the one traffic lane 200, respectively, to the opposite transport direction and the another traffic lane 201, respectively, and vice versa cannot be possible for the sample container carriers 110 moved on the route categorized transport plane module 130a.

In step b) at least one another transport plane module 130b of the transport plane modules can be assigned to a waypoint category such as, for example, by the control device 170. A change from one transport direction to the opposite transport direction and vice versa can be enabled for the sample container carriers 110 moved on the waypoint categorized transport plane module 130b.

The method of operating the laboratory sample distribution system 100 will now be described in detail with reference to FIGS. 3 to 11.

FIG. 3 schematically shows two transport plane modules 130a assigned to the route category. In FIG. 3-14b, a logical field with no hatch denotes a field of a traffic lane. On each transport plane module 130a two, in one embodiment adjacent, traffic lanes 200 with a given transport direction can be formed, in FIG. 3 from left to right as depicted by arrows. Furthermore, on each transport plane module 130a two, in one embodiment adjacent, traffic lanes 201 with a given opposite transport direction can be formed, in FIG. 3 from right to left. In the shown embodiment, the traffic lanes 200, 201 can be formed or arranged directly next to each other. A change from one transport direction to the opposite transport direction and vice versa may not be possible for the sample container carriers 110 moved on the route categorized transport plane modules 130a. In the shown embodiment, the transport plane modules 130a can be arranged, such that the traffic lanes 200, 201 on the modules can be in extension of each other.

Furthermore, in FIG. 3-14b, a logical field with a hatch from top right to bottom left denotes a field of a buffer lane. On each route categorized transport plane module 130a next to a traffic lane 200, 201 of the traffic lanes, in one embodiment directly next to the in FIG. 3 outer traffic lanes 200, 201 to the outside of them, two buffer lanes 230 can be formed. Each of the buffer lanes 230 can be configured to receive a number of the sample container carriers 110 from the corresponding traffic lane 200, 201, to buffer the received sample container carriers and to return the buffered sample container carriers to the corresponding traffic lane, as depicted in FIG. 3 by arrows. In the shown embodiment, the transport plane modules 130a can be arranged, such that the buffer lanes 230 on the modules can be in extension of each other.

Moreover, the traffic lanes 200, 201 and the buffer lanes 230 formed on the route categorized transport plane modules 130a can be symmetrically arranged such as, for example, rotationally-symmetrically around 180 degrees.

Figure 4:
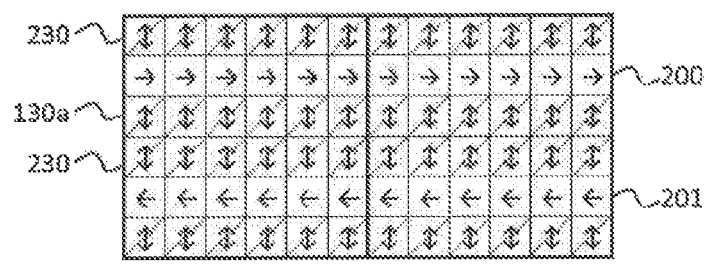
FIG. 4 illustrates schematically other route categorized transport plane modules according to an embodiment of the present disclosure.

FIG. 4 schematically shows another embodiment with two other transport plane modules 130a assigned to the route category. On each transport plane module 130a, one traffic lane 200 with a given transport direction can be formed. Furthermore, on each transport plane module 130a, one traffic lane 201 with a given opposite transport direction can be formed. In the shown embodiment, the traffic lanes 200, 201 can be formed or arranged apart from each other.

Furthermore, on each route categorized transport plane module 130a next to the traffic lanes 200, 201 such as, for example, directly next to them, four buffer lanes 230 can be formed. In detail, the one traffic lane 200 can be arranged in between two of the four buffer lanes 230. The another traffic lane 201 can be arranged in between two other of the four buffer lanes 230.

Figure 5:
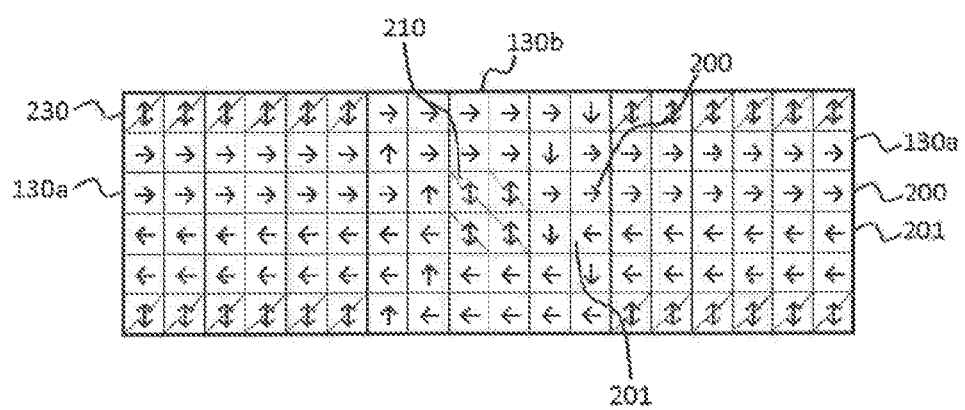
FIG. 5 illustrates schematically other transport plane modules assigned to a route category and a transport plane module assigned to a waypoint category according to an embodiment of the present disclosure.

FIG. 5 schematically shows another embodiment with two transport plane modules 130a assigned to the route category and one transport plane module 130b assigned to the waypoint category. In the shown embodiment, the waypoint categorized transport plane module 130b can be arranged in between the route categorized transport plane modules 130a such as, for example, on a straight.

The route categorized transport plane modules 130a can be similar to the modules depicted in FIG. 3.

A change from one transport direction to the opposite transport direction and vice versa can be enabled for the sample container carriers 110 moved on the waypoint categorized transport plane module 130b.

In detail, in FIG. 5-11, a logical field with a hatch from top left to bottom right denotes a field of a change area. On the waypoint categorized transport plane module 130b, a change area 210 can be formed. In the shown embodiment, the change area 210 can be formed in the center of the module 130b. The change area 210 can be configured to receive a sample container carrier 110 of the sample container carriers from the one traffic lane 200 with a given transport direction and to pass the received sample container carrier to the another traffic lane 201 with an opposite transport direction and vice versa.

Furthermore, on the waypoint categorized transport plane module 130b two such as, for example, adjacent, traffic lanes 200 with a given transport direction can be formed, in FIG. 5 from left to right. Moreover, on the waypoint categorized transport plane module 130b, two, in one embodiment adjacent, traffic lanes 201 with a given opposite transport direction can be formed, in FIG. 5 from right to left. The change area 210 can be arranged in between the opposite traffic lanes 200, 201 at their sides such as, for example, directly next to the in FIG. 5 inner traffic lanes to the inside of them. The change area 210 can be configured to receive a sample container carrier 110 of the sample container carriers from one of the traffic lanes 200 formed on the waypoint categorized transport plane module 130b and to pass the received sample container carrier 110 to another of the traffic lanes 201 formed on the waypoint categorized transport plane module 130b, in FIG. 5 from top to bottom, and vice versa, as depicted by arrows. In the shown embodiment, the traffic lanes 200, 201 formed on the waypoint categorized transport plane module 130b can be in extension of the traffic lanes 200, 201 formed on the route categorized transport plane modules 130a.

Moreover, the change area 210 can be completely surrounded by the traffic lanes 200, 201 formed on the waypoint categorized transport plane module 130b.

Further, the traffic lanes 200, 201 and change area 210 formed on the waypoint categorized transport plane module 130b can be symmetrically arranged such as, for example, rotationally-symmetrically around 180 degrees.

In the shown embodiment, a sample container carrier 110 of the sample container carriers coming from the in FIG. 5 left route categorized transport plane module 130a onto the waypoint categorized transport plane module 130b may be received from the left from the one traffic lane 200 by the top left field of the change area 210, passed to the bottom left field of the change area 210 and passed to the left to the another traffic lane 201. A sample container carrier 110 coming from the in FIG. 5 right route categorized transport plane module 130a onto the waypoint categorized transport plane module 130b may be received from the right from the another traffic lane 201 by the bottom right field of the change area 210, passed to the top right field of the change area 210 and passed to the right to the one traffic lane 200.

In general, transport paths of direction changing sample container carriers such as, for example, having opposite directions, may not cross or intersect each other.

Figure 6:
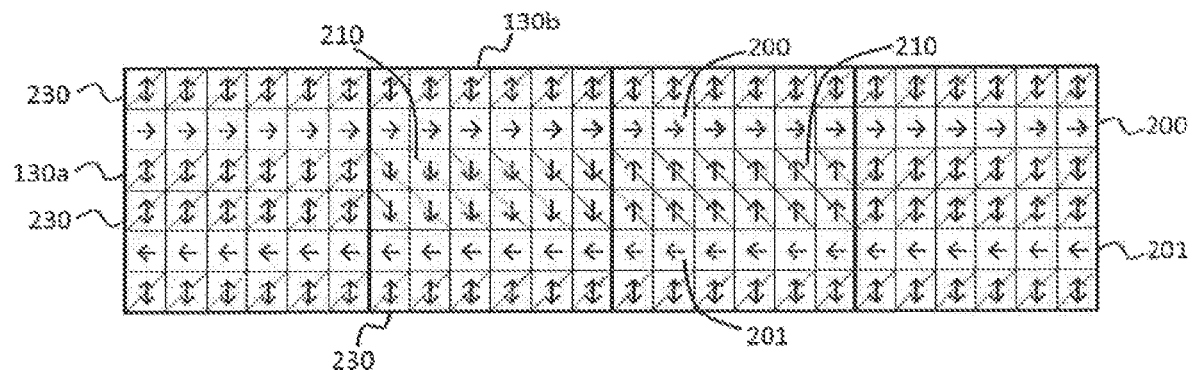
FIG. 6 illustrates schematically other route categorized transport plane modules and other waypoint categorized transport plane modules according to an embodiment of the present disclosure.

FIG. 6 schematically shows another embodiment with two transport plane modules 130a assigned to the route category and two transport plane modules 130b assigned to the waypoint category. In the shown embodiment, the waypoint categorized transport plane modules 130b can be arranged in between the route categorized transport plane modules 130a such as, for example, on a straight.

The route categorized transport plane modules 130a are similar to the modules depicted in FIG. 4.

The waypoint categorized transport plane modules 130b can be similar to the route categorized transport plane modules 130a with the exception that on each waypoint categorized transport plane module 130b, the inner buffer lanes 230 are replaced by a change area 210. In other words, each of the change areas 210 can be arranged in between the opposite traffic lanes 200, 201 at their sides such as, for example, directly next to them.

In the shown embodiment, the transport plane modules 130a and the waypoint categorized transport plane modules 130b can be arranged, such that the traffic lanes 200, 201 on the modules can be in extension of each other. Further, they can be arranged such that the, and in one embodiment, outer, buffer lanes can be in extension of each other.

The change area 210 on the in FIG. 6 left waypoint categorized transport plane module 130b can be configured to receive a sample container carrier 110 from the traffic lane 200 formed on the waypoint categorized transport plane module 130b and to pass the received sample container carrier 110 to the another traffic lane 201 formed on the waypoint categorized transport plane module 130b, in FIG. 6 from top to bottom. In the shown embodiment, the sample container carriers 110 can be moved within the change area 210, and in one embodiment only, in a single direction, as depicted by arrows. In detail, a change within the change area 210 can be possible only from the one traffic lane 200 with a given transport direction to the another traffic lane 201 with an opposite transport direction and not from the another traffic lane to the one traffic lane.

Furthermore, the change area 210 on the in FIG. 6 right waypoint categorized transport plane module 130b can be configured to receive a sample container carrier 110 from the another traffic lane 201 formed on the waypoint categorized transport plane module 130b and to pass the received sample container carrier 110 to the one traffic lane 200 formed on the waypoint categorized transport plane module 130b, in FIG. 6 from bottom to top. In the shown embodiment, the sample container carriers 110 can be moved within the change area 210, and in one embodiment only, in a single direction, as depicted by arrows. In detail, a change within the change area 210 can be possible only from the another traffic lane 201 with an opposite transport direction to the one traffic lane 200 with a given transport direction and not from the one traffic lane to the another traffic lane.

In the shown embodiment, a sample container carrier 110 coming from the in FIG. 6 left route categorized transport plane module 130a onto the left waypoint categorized transport plane module 130b may be received from the top from the one traffic lane 200 by the change area 210 and passed to the bottom to the another traffic lane 201. A sample container carrier 110 coming from the in FIG. 6 right route categorized transport plane module 130a onto the right waypoint categorized transport plane module 130b may be received from the bottom from the another traffic lane 201 by the change area 210 and passed to the top to the one traffic lane 200. In general, the change areas may be arranged, such that transport paths of direction changing sample container carriers such as, for example, having opposite directions, may not cross or intersect each other.

Moreover, the traffic lanes 200, 201, the buffer lanes 230 and the change areas 210 formed on the waypoint categorized transport plane modules 130b can be symmetrically arranged such as, for example, rotationally-symmetrically around 180 degrees.

Figure 7:
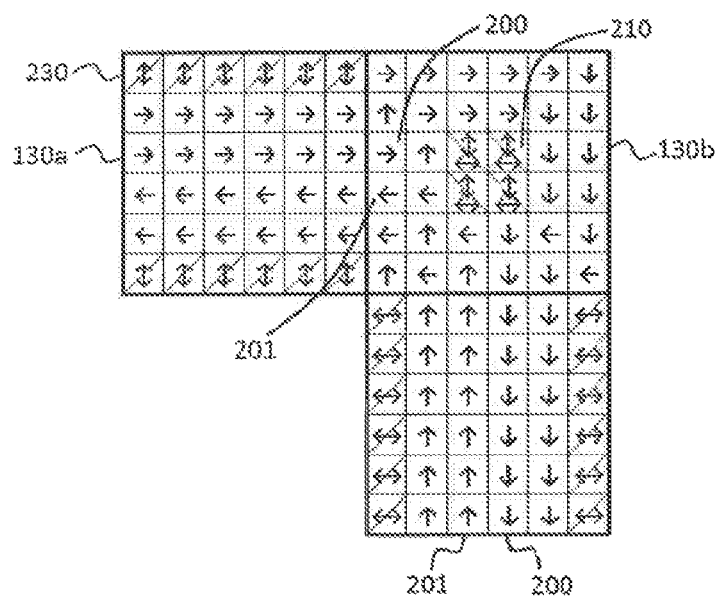
FIG. 7 illustrates schematically other route categorized transport plane modules and another waypoint categorized transport plane module according to an embodiment of the present disclosure.

FIG. 7 schematically shows another embodiment with two transport plane modules 130a assigned to the route category and one transport plane module 130b assigned to the waypoint category. This embodiment is similar to the embodiment shown in FIG. 5 with the exception that the modules are not arranged on a straight. In the embodiment shown in FIG. 7, the waypoint categorized transport plane module 130b can be arranged in between the route categorized transport plane modules 130a, in particular such that the modules form a curve, a turn or a corner.

In detail, the route categorized transport plane modules 130a are similar to the route categorized transport plane modules depicted in FIGS. 3 and/or 5.

Furthermore, the waypoint categorized transport plane module 130b is similar to the waypoint categorized transport plane module depicted in FIG. 5 with the exception that the traffic lanes 200, 201 form a curve. Moreover, the change area 210 can be completely surrounded by the traffic lanes 200, 201 formed on the waypoint categorized transport plane module 130b, in one embodiment, such that this may allow to receive and/or to pass a sample container carrier 110 from and/or to all sides of the change area 210, as depicted in FIG. 7 by arrows.

Figure 8:
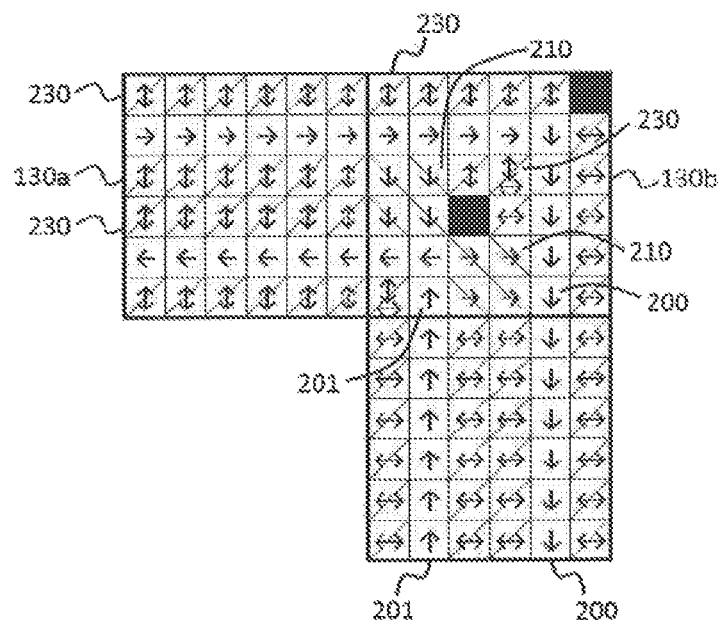
FIG. 8 illustrates schematically other route categorized transport plane modules and another waypoint categorized transport plane module according to an embodiment of the present disclosure.

FIG. 8 schematically shows another embodiment with two transport plane modules 130a assigned to the route category and one transport plane module 130b assigned to the waypoint category. This embodiment is similar to the embodiment shown in FIG. 6 with the exception that here is, in particular only, one waypoint categorized transport plane module 130b present and that the modules are not arranged on a straight. In the embodiment shown in FIG. 8, the waypoint categorized transport plane module 130b can be arranged in between the route categorized transport plane modules 130a, in one embodiment, such that the modules form a curve.

In detail, the route categorized transport plane modules 130a are similar to the route categorized transport plane modules depicted in FIGS. 4 and/or 6.

Furthermore, the waypoint categorized transport plane module 130b can be similar to the waypoint categorized transport plane modules depicted in FIG. 6 with the exception that the traffic lanes 200, 201 form a curve and that the, in one embodiment two, change areas 210 can be formed on the, in one embodiment, one, waypoint categorized transport plane module 130b.

In addition, a buffer lane 230 can be arranged in between the traffic lanes 200, 201 on the waypoint categorized transport plane module 130b.

Moreover, in FIG. 8-11, a logical field completely filled or in black denotes a field, which may not be needed.

Figure 9:
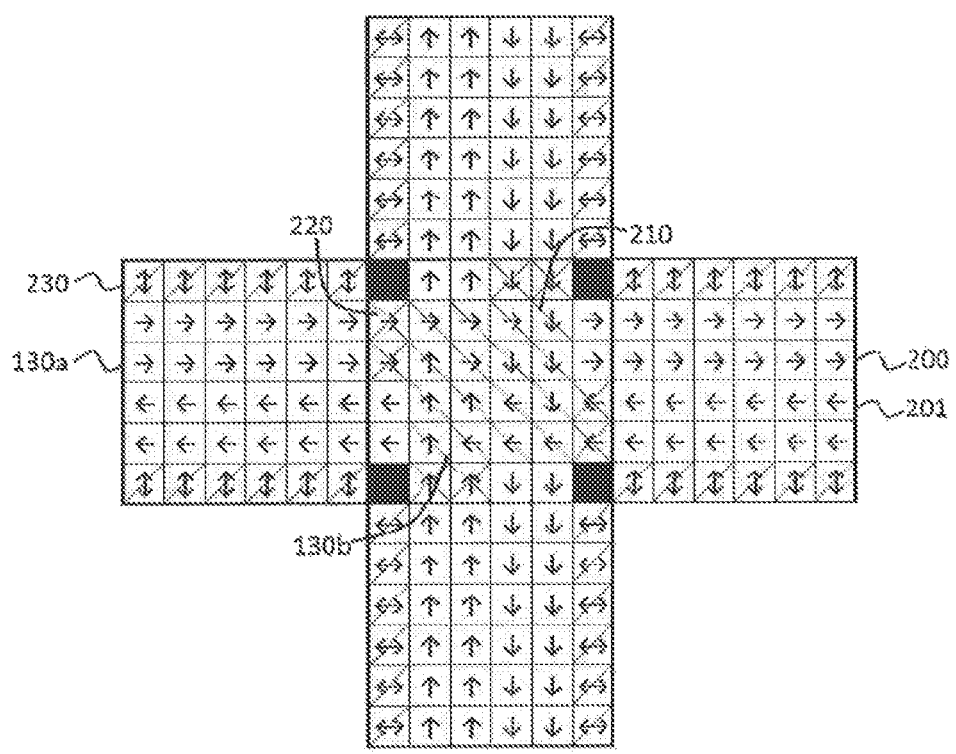
FIG. 9 illustrates schematically other route categorized transport plane modules and another waypoint categorized transport plane module according to an embodiment of the present disclosure.

FIG. 9 schematically shows another embodiment with four transport plane modules 130a assigned to the route category and one transport plane module 130b assigned to the waypoint category. In detail, the route categorized transport plane modules 130a are similar to the route categorized transport plane modules depicted in FIGS. 3, 5 and/or 7.

In the shown embodiment, the waypoint categorized transport plane module 130b can be arranged in between the route categorized transport plane modules 130a, in one embodiment such that the modules form a cross. In alternative embodiments, a different number as four route categorized transport plane modules may be present. For example, three route categorized transport plane modules may be present, and in one embodiment, such that the modules form a T. For example, two route categorized transport plane modules may be present, and in one embodiment, arranged on a straight or such that the modules form a curve.

Furthermore, a change area 210 can be formed in the center of the waypoint categorized transport plane module 130b. In the shown embodiment, the sample container carriers 110 can be moved within the change area 210, and in one embodiment, only, in a single direction, as depicted in FIG. 9 by arrows. In detail, the sample container carriers 110 can be moved within the change area 210 in a circle such as, for example, clockwise. In alternative embodiments, the sample container carriers may be moved within the change area anticlockwise.

Moreover, on the waypoint categorized transport plane module 130b traffic lanes 200, 201 can be formed.

Figure 10:
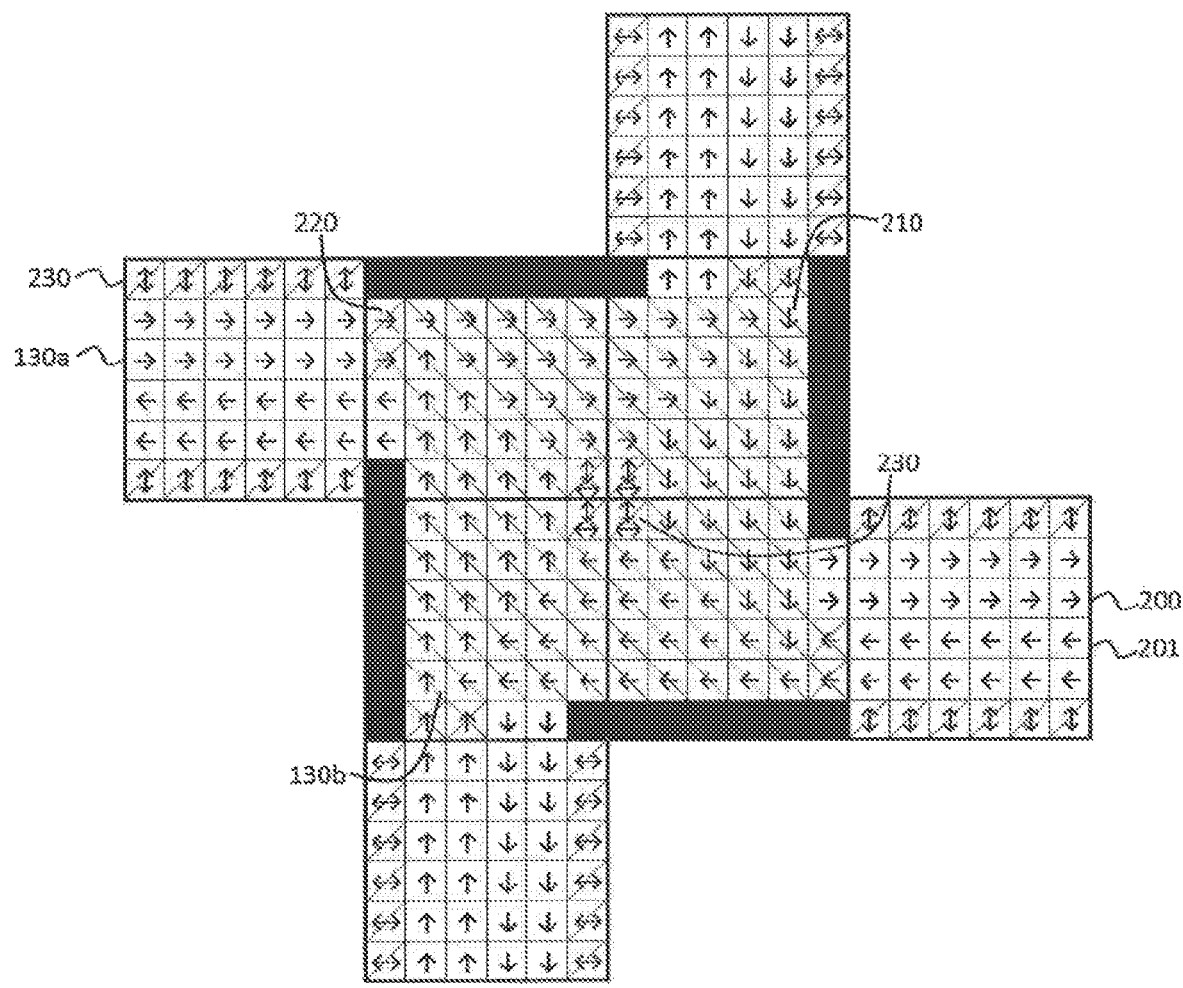
FIG. 10 illustrates schematically other route categorized transport plane modules and another waypoint categorized transport plane module according to an embodiment of the present disclosure.
Figure 11:
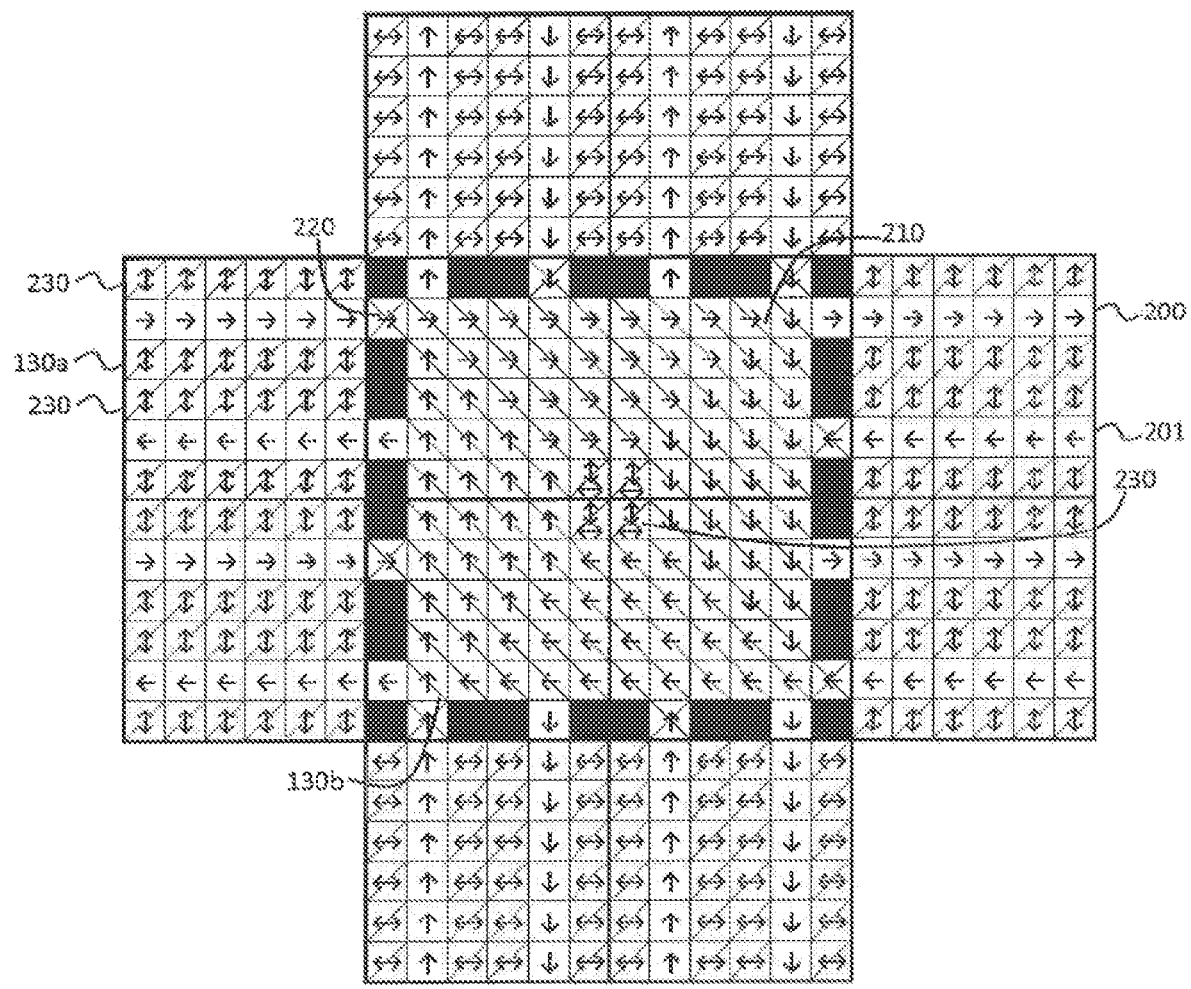
FIG. 11 illustrates schematically other route categorized transport plane modules and another waypoint categorized transport plane module according to an embodiment of the present disclosure.

In addition, in FIGS. 9-11, a logical field with a hatch from top left to bottom right and from top right to bottom left denotes a field of an enter area. On the waypoint categorized transport plane module 130b, an enter area 220 can be formed, and in one embodiment, four enter areas 220 can be formed. Each of the enter areas 220 can be arranged in between the change area 210 and a traffic lane 200, 201 of the traffic lanes directing to the change area 210, and in one embodiment, in extension of the traffic lane 200, 201. Each of the enter areas 220 can be configured to receive a sample container carrier 110 of the sample container carriers from the traffic lane 200, 201 and to pass the received sample container carrier 110 to the change area 210, when there is no cross traffic within the change area 210 blocking the sample container carrier 110.

Further, the traffic lanes 200, 201, the change area 210 and the enter areas 220 formed on the waypoint categorized transport plane module 130b can be symmetrically arranged such as, for example, rotationally-symmetrically around 90 degrees.

FIG. 10 schematically shows another embodiment with four transport plane modules 130a assigned to the route category and four transport plane modules 130b assigned to the waypoint category. This embodiment is similar to the embodiment shown in FIG. 9 with the exception that here can be four waypoint categorized transport plane modules 130b present. In the embodiment shown in FIG. 10, the waypoint categorized transport plane modules 130b can be arranged in between the route categorized transport plane modules 130a such that the modules form a cross, for example.

In detail, to the left of the top left waypoint categorized transport plane module 130b a route categorized transport plane module 130a can be arranged. To the top of the top right waypoint categorized transport plane module 130b, a route categorized transport plane module 130a can be arranged. To the right of the bottom right waypoint categorized transport plane module 130b, a route categorized transport plane module 130a can be arranged. To the bottom of the bottom left waypoint categorized transport plane module 130b, a route categorized transport plane module 130a can be arranged. In alternative embodiments, the route categorized transport plane modules and/or the waypoint categorized transport plane modules may be arranged in a different manner.

Furthermore, the route categorized transport plane modules 130a can be similar to the route categorized transport plane modules depicted in FIGS. 3, 5, 7 and/or 9.

Moreover, the waypoint categorized transport plane modules 130b can be similar to the waypoint categorized transport plane module depicted in FIG. 6 with the exception that the change area 210 can be formed on the, and in one embodiment four, waypoint categorized transport plane modules 130b.

In addition, a buffer lane 230 can be arranged on the waypoint categorized transport plane modules 130b. In the shown embodiment, the buffer lane 230 can be completely surrounded by the change area 210. In one embodiment, such that this may allow to receive a number of the sample container carriers 110 from the change area 210 to all sides of the buffer lane 230 and/or to return the buffered sample container carriers 110 to the change area 210 from all sides of the buffer lane 23, as depicted in FIG. 10 by arrows.

Further, the traffic lanes 200, 201, the buffer lane 230, the change area 210 and the enter areas 220 formed on the waypoint categorized transport plane modules 130b can be symmetrically arranged such as, for example, rotationally-symmetrically around 90 degrees.

FIG. 11 schematically shows another embodiment with eight transport plane modules 130a assigned to the route category and four transport plane modules 130b assigned to the waypoint category. In the shown embodiment, the waypoint categorized transport plane modules 130b can be arranged in between the route categorized transport plane modules 130a, and in one embodiment such that the modules form a cross. In alternative embodiments, a different number as eight route categorized transport plane modules may be present. For example, four route categorized transport plane modules may be present such as, for example, arranged as depicted in FIG. 10. For example, six route categorized transport plane modules may be present such as, for example, such that the modules form a T. For example, four route categorized transport plane modules may be present, and in one embodiment, arranged on a straight or such that the modules form a curve.

In detail, the route categorized transport plane modules 130a can be similar to the route categorized transport plane modules depicted in FIGS. 4, 6 and/or 8.

Furthermore, the waypoint categorized transport plane modules 130b can be similar to the waypoint categorized transport plane modules depicted in FIG. 10 with the exception that here are eight enter areas 220 present and the traffic lanes 200, 201 can be arranged in a different manner.

Moreover, the traffic lanes 200, 201, the buffer lane 230, the change area 210 and the enter areas 220 formed on the waypoint categorized transport plane modules 130b can be symmetrically arranged such as, for example, rotationally-symmetrically around 90 degrees.

Furthermore, the laboratory sample distribution system 100 can be operated by the method as follows.

The method can comprise checking the number of electro-magnetic actuators 140 for errors and forming and/or reforming the traffic lanes 200, 201 and/or the buffer lane/s 230 and/or the change area/s 210 and/or the enter area/s 220, and in one embodiment only, above error-free electro-magnetic actuators.

The method operating the laboratory sample distribution system 100 will now be described in detail with reference to FIGS. 12a-14b. In detail, in FIGS. 12a-14b, a logical field with an E can denote a field with an erroneous electro-magnetic actuator 140 below.

FIG. 12a schematically shows a route categorized transport plane module 130a, which can be in one embodiment similar to the route categorized transport plane modules depicted in FIG. 3. Below a field of the traffic lane 200 denoted with the E, the corresponding electro-magnetic actuator can be erroneous. Hence, the traffic lanes 200 and the buffer lane 230 next to the traffic lanes 200 can be reformed or rearranged, and in one embodiment, only above error-free electro-magnetic actuators, as depicted in FIG. 12b. In the shown embodiment, the reformed buffer lane 230 can be arranged in between the opposite traffic lanes 200, 201. Furthermore, the reformed buffer lane 230 can be interrupted. The field denoted with the E may not be used, and in one embodiment, at least until the error is solved.

FIG. 13a schematically shows three route categorized transport plane modules 130a, which can be similar to the route categorized transport plane modules depicted in FIGS. 3, 12a and 12b. Below, and in one embodiment, two, fields of the traffic lanes 200 denoted with the E the corresponding electro-magnetic actuators can be erroneous. In detail, the fields denoted with the E can be arranged apart from each other. Hence, the traffic lanes 200 and the buffer lane 230 next to the traffic lanes 200 can be reformed, as depicted in FIG. 13b. In the shown embodiment, the reformed buffer lane 230 can be partially arranged in between the opposite traffic lanes 200, 201 and partially arranged in between the traffic lanes 200. Furthermore, the reformed buffer lane 230 can be interrupted.

Figure 14A:
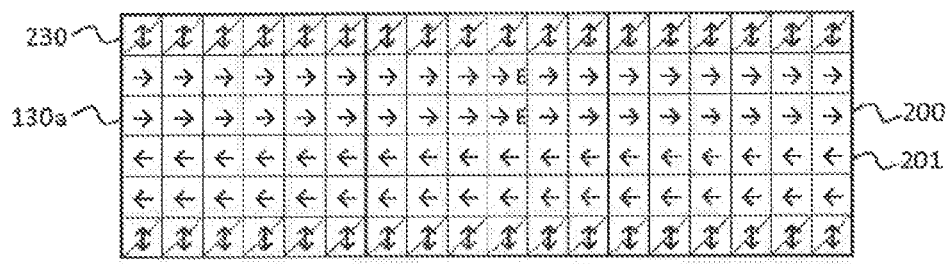
FIG. 14a illustrates schematically other route categorized transport plane modules with erroneous electro-magnetic actuators below according to an embodiment of the present disclosure.
Figure 14B:
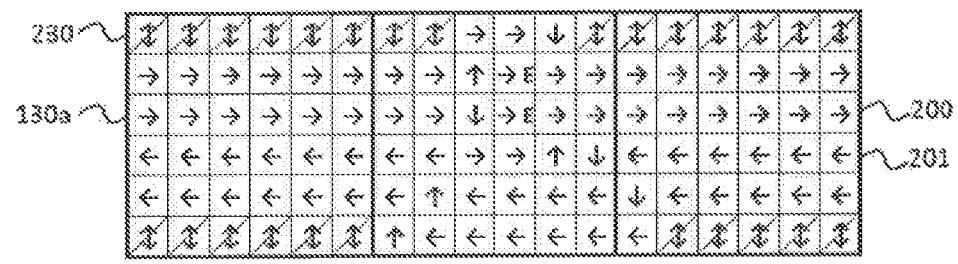
FIG. 14b illustrates schematically the route categorized transport plane modules of FIG. 14a with reformed traffic lanes and reformed buffer lanes according to an embodiment of the present disclosure.

FIG. 14a schematically shows three route categorized transport plane modules 130a, which can be in one embodiment similar to the route categorized transport plane modules depicted in FIGS. 3 and 12a-13b. Below, and in one embodiment, two, fields of the traffic lanes 200 denoted with the E the corresponding electro-magnetic actuators can be erroneous. In detail, the fields denoted with the E can be arranged directly next to each other. Hence, the traffic lanes 200, 201 and the buffer lanes 230 can be reformed, as depicted in FIG. 14b. In the shown embodiment, the reformed traffic lanes 200, and in one embodiment completely, surround the fields denoted with the E. Furthermore, the buffer lanes 230 can be interrupted.

Moreover, the laboratory sample distribution system 100 can be operated by the method as follows.

The method can comprise assigning at least three transport plane modules 130c of the transport plane modules to a laboratory station category, and in one embodiment by the control device 170. Handling a sample container carrier 110 of the sample container carriers, handling a sample container 120 and/or handling a sample by a laboratory station 20 can be enabled on each of the laboratory station categorized transport plane modules 130c.

The method can comprise assigning at least four transport plane modules 130b to the waypoint category. To each of the laboratory station categorized transport plane modules 130c, one of the waypoint categorized transport plane modules 130b can be assigned or arranged, and in one embodiment, directly next to it.

The method can comprise assigning at least three transport plane modules 130a to the route category. In between each two of the waypoint categorized transport plane modules 130b, at least one of the route categorized transport plane modules 130a can be arranged, and in one embodiment, directly next to one or both of them.

The method can comprise determining a route for a movement of the sample container carrier 110 from one laboratory station categorized transport plane module 130c to another laboratory station categorized transport plane module 130c by listing the waypoint categorized transport plane modules 130b and their order in between them. The method can also comprise moving the sample container carrier 110 from one waypoint categorized transport plane module 130b to the next one according to the determined list.

The method operating the laboratory sample distribution system 100 will now be described in detail with reference to FIG. 15. In the shown embodiment, the sample container carrier 110 can be moved from one laboratory station categorized transport plane module 130c denoted with Dev1 to another laboratory station categorized transport plane module 130c denoted with Dev2. Hence, a route can be determined by listing the waypoint categorized transport plane modules 130b and their order in between them, e.g. denoted with Wp1, Wp2, Wp3, Wp4, Wp9, Wp12, Wp13 and Wp14. Then, the sample container carrier 110 can be moved from one waypoint categorized transport plane module 130b to the next one according to the determined list.

This can determine the route in a relative simple way. Furthermore, this may enable a rerouting or redirecting of the sample container carrier 110 in a relative simple way, and in one embodiment, to another target laboratory station 20, e.g. if the primary target laboratory station 20 is offline.

In the shown embodiment, the target laboratory station 20 next to the laboratory station categorized transport plane module 130c denoted with Dev2 can go offline when the sample container carrier 110 is moved in between the waypoint categorized transport plane modules 130b denoted with Wp4 and Wp9. Then the sample container carrier 110 can be moved to another target laboratory station 20 next to the laboratory station categorized transport plane module 130c denoted with Dev3. Hence, another route can be determined by listing the waypoint categorized transport plane modules 130b and their order in between them, e.g. denoted with Wp9, Wp4, Wp5 and Wp6. Then, the sample container carrier 110 can be moved from one waypoint categorized transport plane module 130b to the next one according to the determined list.

Further, the laboratory sample distribution system 100 and the laboratory automation system 10, respectively, may be changed. In detail, transport plane modules 130a, 130b, 130c may be added to the laboratory sample distribution system 100 and/or removed from the laboratory sample distribution system 100 and/or rearranged within the laboratory sample distribution system 100. Also, laboratory stations 20 may be added to the laboratory automation system 10 and/or removed from the laboratory automation system 10 and/or rearranged with the laboratory automation system 10. Accordingly, a categorization of a transport plane module 130a, 130b, 130c may be changed. Additionally, or alternatively, a traffic lane 200, 201, a change area 210, an enter area 220 and/or a buffer lane 230 formed on the transport plane module 130a, 130b, 130c may be changed.

Figure 15:
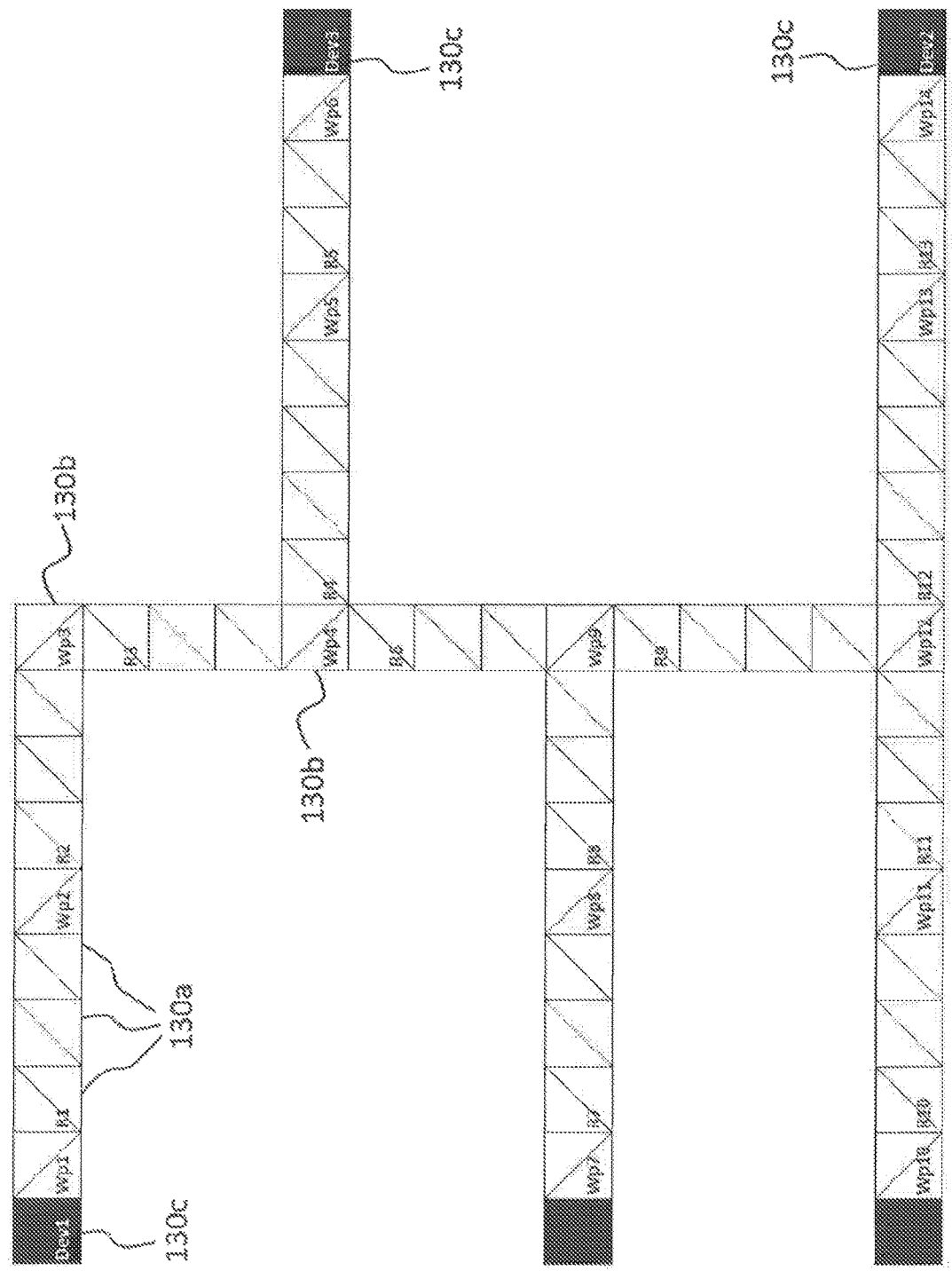
FIG. 15 illustrates schematically other transport plane modules assigned to a route category, other transport plane modules assigned to a waypoint category and other transport plane modules assigned to a laboratory station category according to an embodiment of the present disclosure.

For example, in the embodiment shown in FIG. 15 the curve or corner formed at the waypoint categorized transport plane module 130b denoted with Wp3 may be changed into a T-form by adding a transport plane module next to it to the top in FIG. 15, as already present at the waypoint categorized transport plane module 130b denoted with Wp9. Additionally, or alternatively, the T-form at the waypoint categorized transport plane module 130b denoted with Wp9 may be changed into a cross-form by adding a transport plane module next to it to the right in FIG. 15. Additionally, or alternatively, the T-form at the waypoint categorized transport plane module 130b denoted with Wp12 may be changed into a curve by removing the transport plane modules next to it to the left in FIG. 15.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A method of operating a laboratory sample distribution system, wherein the laboratory sample distribution system comprises a plurality of sample container carriers, wherein each of the sample container carriers comprises at least one magnetically active device and wherein each of the sample container carriers is configured to carry at least one sample container, a plurality of interconnected transport plane modules, wherein each of the transport plane modules is configured to support a plurality of the sample container carriers, and a plurality of electro-magnetic actuators, wherein below each transport plane module a plurality of the electro-magnetic actuators is stationary arranged in rows and columns, wherein the electro-magnetic actuators are configured to move a sample container carrier of the sample container carriers on top of the transport plane modules along a row of the rows or along a column of the columns by applying a magnetic move force to the sample container carrier, wherein the electro-magnetic actuators are driven individually by a control device in order to generate a magnetic field, wherein the magnetic field interacts with the magnetically active device of a sample container carrier and wherein, by interaction, the electromagnetic actuators apply the magnetic move force to the sample container carrier, the method comprising:

assigning at least one transport plane module of the transport plane modules to a route category by the control device, wherein at least two traffic lanes are formed on the route categorized transport plane module, wherein the sample container carriers are moved within each traffic lane in a given transport direction, wherein the transport directions of the at least two traffic lanes are opposite to each other and wherein a change from one transport direction to the opposite transport direction is not possible for the sample container carriers moved on the route categorized transport plane module; and assigning at least one another transport plane module of the transport plane modules to a waypoint category by the control device, wherein a change from one transport direction to the opposite transport direction is enabled for the sample container carriers moved on the waypoint categorized transport plane module, wherein a change area is formed on the waypoint categorized transport plane module and wherein the change area is configured to receive a sample container carrier of the sample container carriers from one traffic lane with a given transport direction and to pass the received sample container carrier to another traffic lane with an opposite transport direction, wherein an enter area is formed on the waypoint categorized transport plane module, wherein the enter area is arranged in between the change area and a traffic lane of the traffic lanes directing to the change area, wherein the enter area is configured to receive a sample container carrier of the sample container carriers from the traffic lane and to pass the received sample container carrier to the change area when there is no cross traffic within the change area blocking the sample container carrier.

2. The method according to claim 1, wherein next to a traffic lane of the traffic lanes, at least one buffer lane is formed on the route categorized transport plane module and/or the waypoint categorized transport plane module and wherein each of the buffer lanes is configured to receive a plurality of the sample container carriers from the corresponding traffic lane to buffer the received sample container carriers and to return the buffered sample container carriers to the corresponding traffic lane.

3. The method according to claim 1, wherein the traffic lanes and/or buffer lanes and/or the change area and/or the enter area formed on the route categorized transport plane module and/or on the waypoint categorized transport plane module are symmetrically arranged.

4. The method according to claim 1, wherein below a transport plane module of the transport plane modules n times n electro-magnetic actuators of the electro-magnetic actuators are stationary arranged in n rows and in n columns, wherein n is an integer and greater than three.

5. The method according to claim 1, wherein at least two traffic lanes are formed on the waypoint categorized transport plane module, wherein said sample container carriers are moved within each traffic lane in a given transport direction, wherein the transport directions of the at least two traffic lanes are opposite to each other, wherein the change area is arranged in between the two traffic lanes at their sides, and wherein the change area is configured to receive a sample container carrier of the sample container carriers from the one traffic lane formed on the waypoint categorized transport plane module and to pass the received sample container carrier to the another traffic lane formed on the waypoint categorized transport plane module.

6. The method according to claim 5, wherein the change area is completely surrounded by the two traffic lanes formed on the waypoint categorized transport plane module.

7. The method according to claim 1, wherein the sample container carriers are moved within the change area in a single direction.

8. The method according to claim 7, wherein a change within the change area is possible only from the one traffic lane with a given transport direction to the another traffic lane with an opposite transport direction and not from the another traffic lane to the one traffic lane.

9. The method according to claim 7, wherein the sample container carriers are moved within the change area in a circle.

10. A method of operating a laboratory sample distribution system, wherein the laboratory sample distribution system comprises a plurality of sample container carriers, wherein each of the sample container carriers comprises at least one magnetically active device and wherein each of the sample container carriers is configured to carry at least one sample container, a plurality of interconnected transport plane modules, wherein each of the transport plane modules is configured to support a plurality of the sample container carriers, and a plurality of electro-magnetic actuators, wherein below each transport plane module a plurality of the electro-magnetic actuators is stationary arranged in rows and columns, wherein the electro-magnetic actuators are configured to move a sample container carrier of the sample container carriers on top of the transport plane modules along a row of the rows or along a column of the columns by applying a magnetic move force to the sample container carrier, wherein the electro-magnetic actuators are driven individually by a control device in order to generate a magnetic field, wherein the magnetic field interacts with the magnetically active device of a sample container carrier and wherein, by interaction, the electromagnetic actuators apply the magnetic move force to the sample container carrier, the method comprising:
  assigning at least one transport plane module of the transport plane modules to a route category by the control device, wherein at least two traffic lanes are formed on the route categorized transport plane module, wherein the sample container carriers are moved within each traffic lane in a given transport direction, wherein the transport directions of the at least two traffic lanes are opposite to each other and wherein a change from one transport direction to the opposite transport direction is not possible for the sample container carriers moved on the route categorized transport plane module;
  assigning at least one another transport plane module of the transport plane modules to a waypoint category by the control device, wherein a change from one transport direction to the opposite transport direction is enabled for the sample container carriers moved on the waypoint categorized transport plane module, wherein a change area is formed on the waypoint categorized transport plane module and wherein the change area is configured to receive a sample container carrier of the sample container carriers from one traffic lane with a given transport direction and to pass the received sample container carrier to another traffic lane with an opposite transport direction;
  checking the plurality of electro-magnetic actuators for errors; and
  forming the traffic lanes and/or buffer lanes and/or the change area and/or enter area above error-free electro-magnetic actuators.

11. A method of operating a laboratory sample distribution system, wherein the laboratory sample distribution system comprises a plurality of sample container carriers, wherein each of the sample container carriers comprises at least one magnetically active device and wherein each of the sample container carriers is configured to carry at least one sample container, a plurality of interconnected transport plane modules, wherein each of the transport plane modules is configured to support a plurality of the sample container carriers, and a plurality of electro-magnetic actuators, wherein below each transport plane module a plurality of the electro-magnetic actuators is stationary arranged in rows and columns, wherein the electro-magnetic actuators are configured to move a sample container carrier of the sample container carriers on top of the transport plane modules along a row of the rows or along a column of the columns by applying a magnetic move force to the sample container carrier, wherein the electro-magnetic actuators are driven individually by a control device in order to generate a magnetic field, wherein the magnetic field interacts with the magnetically active device of a sample container carrier and wherein, by interaction, the electromagnetic actuators apply the magnetic move force to the sample container carrier, the method comprising:

- assigning at least one transport plane module of the transport plane modules to a route category by the control device, wherein at least two traffic lanes are formed on the route categorized transport plane module, wherein the sample container carriers are moved within each traffic lane in a given transport direction, wherein the transport directions of the at least two traffic lanes are opposite to each other and wherein a change from one transport direction to the opposite transport direction is not possible for the sample container carriers moved on the route categorized transport plane module;
- assigning at least one another transport plane module of the transport plane modules to a waypoint category by the control device, wherein a change from one transport direction to the opposite transport direction is enabled for the sample container carriers moved on the waypoint categorized transport plane module, wherein a change area is formed on the waypoint categorized transport plane module and wherein the change area is configured to receive a sample container carrier of the sample container carriers from one traffic lane with a given transport direction and to pass the received sample container carrier to another traffic lane with an opposite transport direction;
- assigning at least three transport plane modules of the transport plane modules to a laboratory station category, wherein handling of a sample container carrier of the sample container carriers, handling of a sample container and/or handling of a sample by a laboratory station is enabled on each of the laboratory station categorized transport plane modules;
- assigning at least four transport plane modules to the waypoint category, wherein to each of the laboratory station categorized transport plane modules one of the waypoint categorized transport plane modules is assigned;
- assigning at least three transport plane modules to the route category, wherein in between each two of the waypoint categorized transport plane modules at least one of the route categorized transport plane modules is arranged;
- determining a route for a movement of the sample container carrier from one laboratory station categorized transport plane module to another laboratory station categorized transport plane module by listing the waypoint categorized transport plane modules and their order in between them; and
- moving the sample container carrier from one waypoint categorized transport plane module to the next one according to the determined list.

* * * * *